United States Patent [19]
Herbert

[11] 3,740,498
[45] June 19, 1973

[54] ELECTRIC CURRENT COLLECTOR

[75] Inventor: Donald L. Herbert, Lexington, Ohio

[73] Assignee: The Ohio Brass Company, Mansfield, Ohio

[22] Filed: Nov. 17, 1971

[21] Appl. No.: 199,463

Related U.S. Application Data

[63] Continuation of Ser. No. 884,621, Dec. 12, 1969, abandoned.

[52] U.S. Cl. .................................... 191/49, 191/69
[51] Int. Cl. ............................................. B60l 5/38
[58] Field of Search .................. 191/45, 47, 48, 49, 191/66, 69; 267/57.1 R

[56] References Cited
UNITED STATES PATENTS

| | | | |
|---|---|---|---|
| 761,432 | 5/1904 | Warren | 191/49 |
| 2,201,422 | 5/1940 | Beebe | 267/57.1 R |
| 3,545,737 | 12/1970 | Lamprey | 267/57.1 R |
| 668,711 | 2/1901 | Davis | 191/49 |
| 3,509,292 | 4/1970 | Dehn | 191/49 |
| 2,461,696 | 2/1949 | Morningstar | 191/49 |

*Primary Examiner*—Gerald M. Forlenza
*Assistant Examiner*—D. W. Keen
*Attorney*—Bosworth, Session, Herrstrom & Cain

[57] ABSTRACT

An electric current collector for railway vehicles, having a collector shoe for running engagement with an electrical distribution rail. The current collector shoe is pivotally and resiliently mounted on a support secured to the vehicle by an elastic torsion member carried by the support which torsion member maintains the collector shoe in working engagement with the distribution rails.

4 Claims, 7 Drawing Figures

Patented June 19, 1973  3,740,498

INVENTOR.
DONALD L. HERBERT
BY Bosworth, Sessions,
Herstrom & Cain
ATTORNEYS

Patented June 19, 1973

INVENTOR.
DONALD L. HERBERT
BY Bosworth, Sessions, Herrstrom & Cain
ATTORNEYS

INVENTOR.
DONALD L. HERBERT
BY Bosworth, Sessions,
Herretrom & Cain
ATTORNEYS

ELECTRIC CURRENT COLLECTOR

This is a continuation of application Ser. No. 884,621 filed Dec. 12, 1969.

BACKGROUND OF THE INVENTION

This invention relates to a traveling electric power collector for electrically driven rail vehicles such as rapid transit cars and more particularly to a resiliently mounted collector shoe for running engagement with an electrical power rail.

The current collector is mounted on one side of a rail car and extends outwardly therefrom to carry a collector shoe or a third rail contact shoe which engages the power rail to provide a continuous electrical connection between the power rail and associated electrical systems for the electrical drive and control systems of the rail car. The collector functions to maintain the collector shoe or third contact shoe in engagement with the power rail, it electrically insulates the shoe from the body of the car, and it provides the necessary terminal connections from the shoe to the electrical apparatus of the car.

Certain disadvantages have been found to exist in the utilization of conventional current collectors particularly for high speed operation. The existing collectors are too heavy for the new lightweight high speed trains because they weigh about 200 pounds each and four are usually required for each car. In addition, the high speed of the train and the unevenness of the rails cause rocking and bouncing of the cars which tend to pull the conventional collector shoes out of contact with the power rail with the resultant disruption of the electrical system and arching and erosion of the collector shoe. Also, the existing collectors are not readily adjustable to compensate for wheel wear or differences in the height of the third rail as compared to the height of rails that support the cars.

SUMMARY OF THE INVENTION

It is therefore an object of the present invention to provide an electric current collector of improved and lightweight construction that will maintain the collector shoe in engagement with the power rail during high speed operation of the rail car. A further object of the present invention is to provide an electric current collector that will maintain the collector shoe in contact with the power rail during rocking and bouncing of the rail car. A further object of this invention is to provide means for adjusting the vertical height of an electric current collector to compensate for wheel wear or differences in rail height.

This invention contemplates an electric current collector for a rail car having means for resiliently supporting a collector shoe for traveling engagement with a power rail. The collector shoe supporting means cooperates with an elastomeric torsion member to maintain the shoe in running engagement with the power rail.

DETAILED DESCRIPTION OF THE PREFERRED EMBODIMENT

Figure 1:
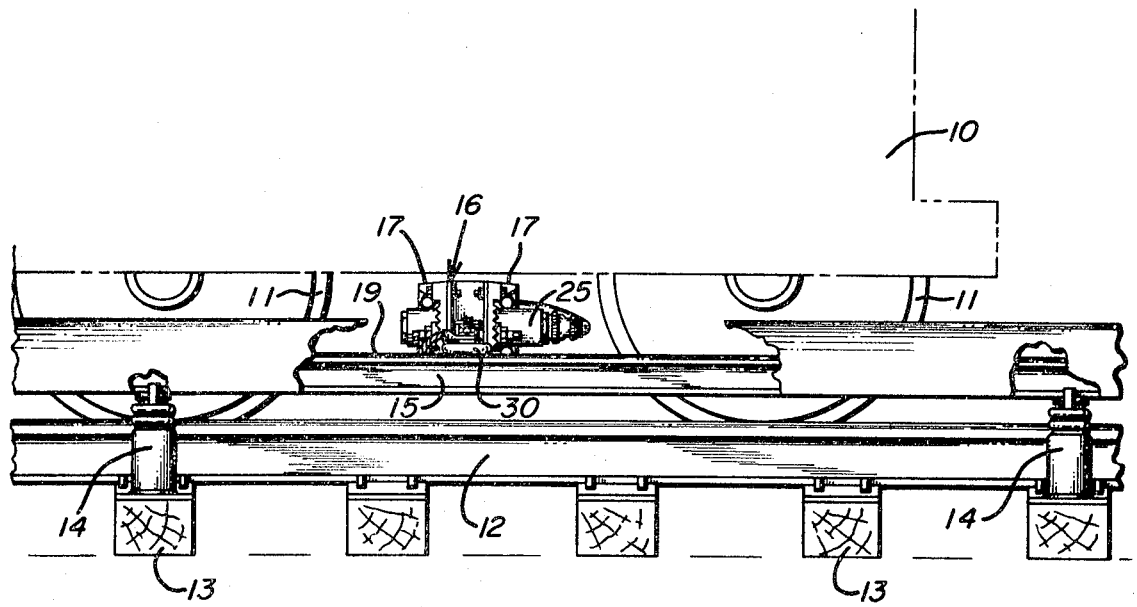
FIG. 1 is a side elevational view, partially in section schematically illustrating the power rail, the car rail and the car carrying the current collector of this invention.
Figure 2:
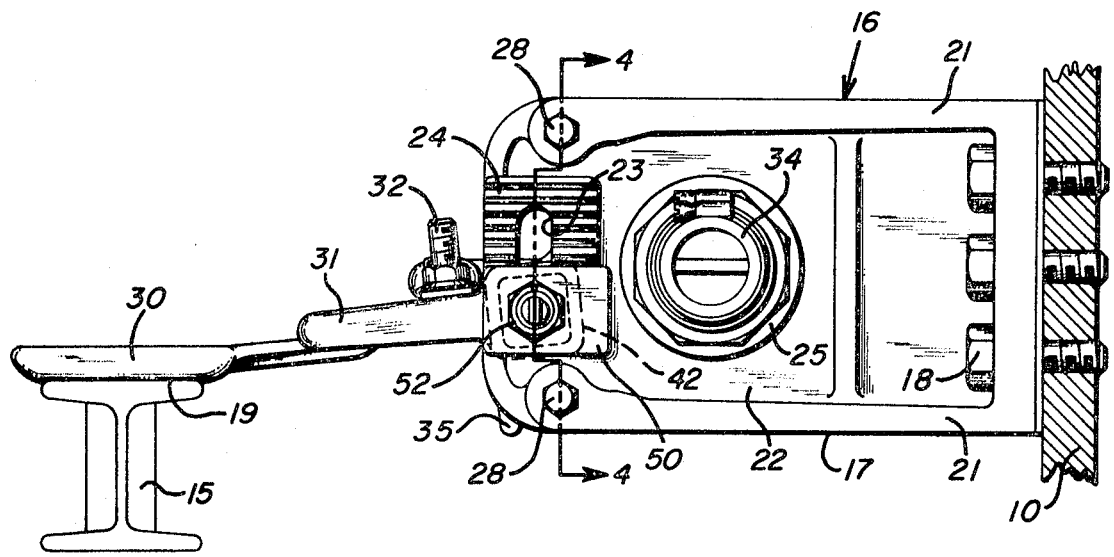
FIG. 2 is a side elevational view of the current collector of this invention.
Figure 3:
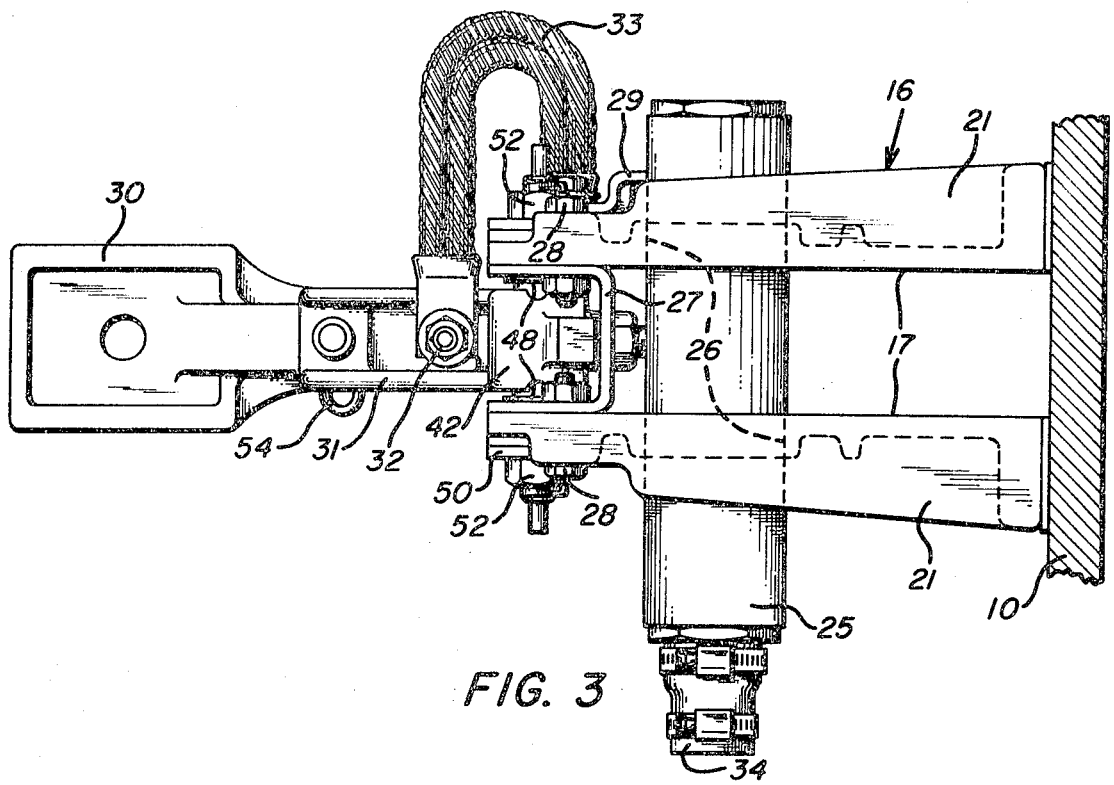
FIG. 3 is a top plan view of the current collector of FIG. 2.
Figure 4:
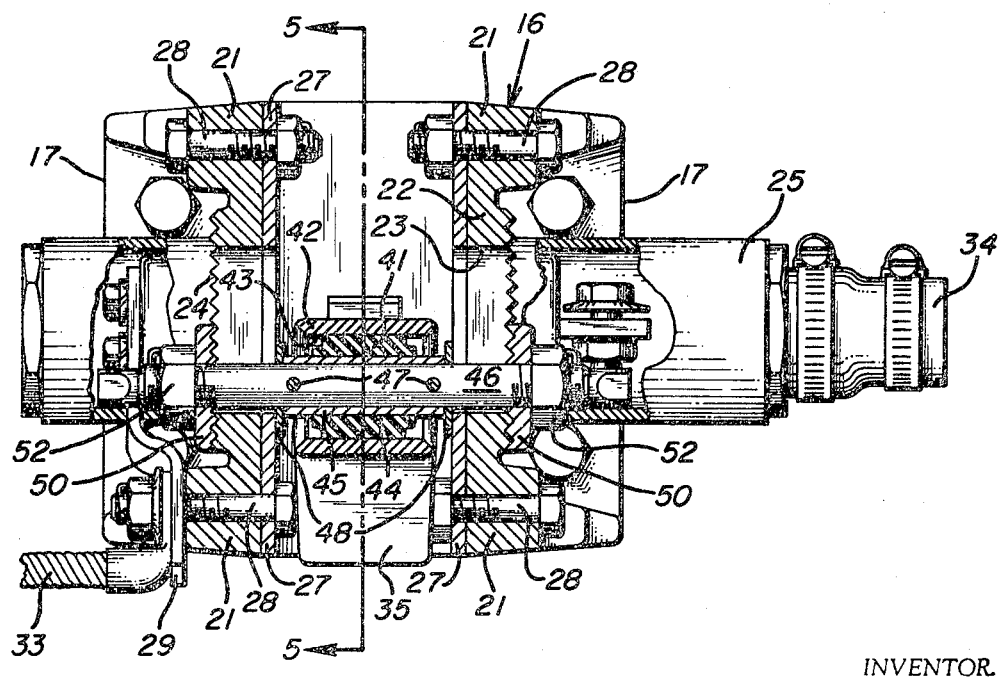
FIG. 4 is a partial cross sectional view taken along the line 4—4 of FIG. 2.
Figure 5:
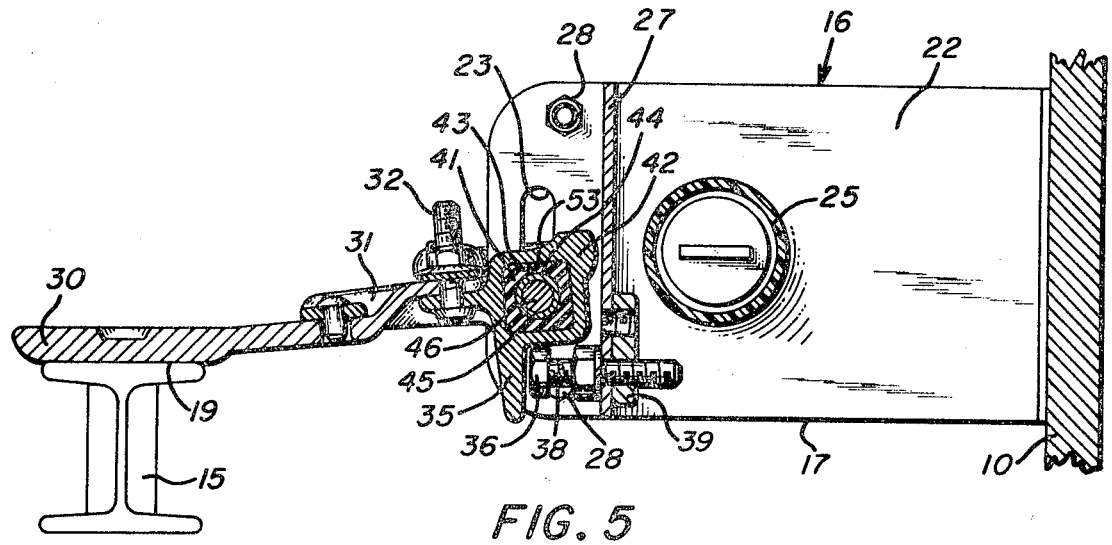
FIG. 5 is a cross sectional view taken along the line 5—5 of FIG. 4.

In FIG. 1 a rapid transit car 10 is schematically illustrated traveling on wheels 11 on rails 12 which are supported by cross ties 13. The cross ties 13 also support a plurality of insulators 14 spaced from one of the rails 12. The insulators 14 support a third or power distribution rail 15 for supplying electric power to the car 10 in the conventional manner for rapid transit electric rail cars.

The electric power is transmitted from the power rail 15 to the car 10 through a current collector 16 carried by the car 10 in conventional manner and the current collector includes a pair of brackets 17 of electrical insulating material, for example, glass fiber reinforced epoxy resin. The brackets 17 are affixed to the car by bolts 18 or other conventional means and as formed, each bracket comprises a pair of parallel arms 21 extending outwardly and generally perpendicular to the car 10. A flat plate member 22 joins each pair of parallel arms 21 and is substantially vertically disposed with respect to the running surface 19 of the power rail 15. An elongated opening 23 is provided near the end of the plate member 22 remote from the car 10. The major axis of the opening 23 is normal to the major axes of the arms 21 and thus extends substantially vertical. That portion of the plate member 22 immediately surrounding the opening 23 is machined or molded to provide a plurality of grooves 24 which are substantially parallel to the arms 21 and whose function will be hereinafter explained.

To prevent flow of excess current through the collector, a conventional fuse box 25 is carried by the two brackets 17 and extends through openings 26 in each bracket 17. A U-shaped member 27 facing in the direction of the third rail 15 maintains the brackets 17 in their proper spaced position. The U-shaped member 27 is secured to the brackets 17 by nut and bolt assemblies 28 at the upper and lower corners of the end of the brackets remote from the car 10.

The electric power from the rail 15 is transmitted to the car 10 through the collector 16 by a third rail contact or collector shoe 30 which shoe is maintained in running engagement with the power rail 15 by the collector 16. The collector shoe 30 is carried by a collector shoe arm 31 pivotally and resiliently supported between the two brackets 17 and the shoe is rigidly secured to the collector shoe arm 31 by a nut and bolt assembly 32. The collector shoe and collector shoe arm are electrically conductive in order that current from the power rail 15 may be transmitted to the rail car 10. Current flows through the collector shoe, collector shoe arm and a conductor cable 33 secured at one end to the collector shoe arm nut and bolt assembly 32 and at the other end to a bus bar 29 thence to and through the fuse box 25 to the car 10 through the connector 34 in the conventional manner.

To limit downward movement of the collector shoe when it is not in contact with the rail 15, a support arm 35 is provided as an integral portion of the collector shoe arm 31. The support arm 35 extends downwardly from the collector shoe arm into contact with the head 36 of a bolt 38 secured to the U-shaped member 27 by nut 39. Changes in position of the head 36 determines the limit of movement of the support arm. A lifting hook 54 extends outwardly from the forward end of the collector shoe arm 31 in order that the shoe may be lifted out of contact with the power rail 15, when required.

Figure 6:
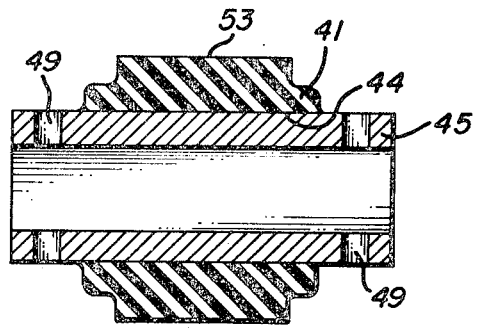
FIG. 6 is a longitudinal cross sectional view of the elastomeric torsion member.
Figure 7:
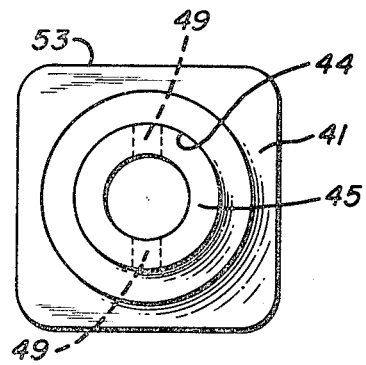
FIG. 7 is an end elevational view of the elastomeric torsion member.

To insure that the collector shoe 30 is maintained in running engagement with the power rail 15 even though the car is rocking or bouncing, the collector shoe arm 31 is pivotally and resiliently supported by an annular end portion 42 of the shoe arm 31 engaging an elastomeric torsion member 41 retained between the two brackets 17. The annular end portion 42 is that end of the collector shoe arm remote from the end that engages the shoe 30 and is substantially polygonal in cross section with a correspondingly shaped bore 43. The elastomeric torsion member 41 is provided with a polygonal shaped external configuration dimensioned to snugly fit within the bore 43 and accordingly its configuration in cross section and elevation (FIGS. 6 and 7) corresponds substantially to the polygonal shaped bore 43 of the annular end portion 42 of the collector shoe arm 31. As shown, the bore 43, annular end portion 42, and torsion member 41 are substantially square in configuration. It should be understood that other configurations may be used with equal facility in this invention.

The torsion member 41 may be formed of rubber or other suitable resilient material and it is provided with a cylindrical bore 44. A cylindrical sleeve 45 extends through the bore 44 and is bonded by any conventional bonding method to the torsion member 41 to form a unitary structure in order that the torsion member will not rotate about the sleeve 45. The sleeve 45 is non-rotatably affixed to a shaft 46 by a pair of conventional spring-type roll pins 47 extending through openings 49 in the sleeve 45. The shaft 46 extends through the openings 23 in the plate members 22 and is held in place by a pair of washers 48 on the inner sides of plate members 22 and a pair of washers 50 on the outer sides of the plate members. The washers 50 are grooved to mate with the grooves 24 and are maintained in mating relationship with the grooves 24 by a pair of lock nuts 52 threaded onto the ends of the shaft 46.

The lock nuts 52 hold in fixed position between the two brackets 17 the washers 50, the washers 48, the shaft 46, the sleeve 45 and the torsion member 41. Since the openings 23 in which the shaft 46 is held extend vertically with respect to the running surface 19 of the rail 15, any change in the position of the grooved washers 50 will raise or lower the shaft 46 and consequently the collector shoe 30. If desired, the elastomeric torsion member 41 may be bonded directly to the shaft 46, thereby eliminating the roll pins 47.

Since the torsion member 41 is rigidly secured to the shaft 46 and carries the collector shoe arm 31, any rotation of the shaft 46 about its axis changes the plane in which the shoe lies. Thus rotation of the shaft in the counterclockwise direction lowers the shoe and rotation of the shaft in the clockwise direction raises the shoe. With the torsion member snugly received within the bore of the annular portion of the shoe support arm, any attempted rotation of the annular end portion about the elastomeric torsion member and the shaft 46 will stress the torsion member.

In the installation of the current collector of this invention the position of the shaft 46 and its associated torsion member 41 to which the collector shoe arm 31 and collector shoe 30 are secured will determined to position the collector shoe 30 below the running surface 19 of the rail 15. This is the position that the shoe would occupy when not in contact with the power rail 15. Such position must be below the running surface of the rail and in the preferred embodiment is set at approximately one and one-half inches below the running surface of the rail 15. When the shoe is placed on the rail, the elastic torsion member will be under stress. The torsion member attempts to return it to its position where the shoe is below the rail height thereby exerting a downward pressure upon the shoe 30. The maintains the shoe in contact with the rail 15 during operation of the rail vehicle. In the positioning of the shoe 30 and collector shoe arm 31, the shaft 46 will be located with its axis parallel to but in a plane above the plane of the running surface of the power distribution rail 15 since a downward pressure is to be exerted on the shoe 30.

To maintain downward pressure on the shoe 30, the upper, substantially flat surface 53 of the torsion member 41 will be in a plane forming an acute angle with the horizontal. Changes in this angle and thus changes in the pressure exerted by the shoe 30 on the rail 15 may be made by loosening the lock nuts 52 and rotating the shaft 46 to the desired position. Rotation of the shaft in the clockwise direction reduces the angle between the surface 53 of torsion member 41 and the horizontal, thereby reducing the pressure exerted by the shoe on the rail. Rotation in the counterclockwise direction increases this angle and consequently increases the pressure of the shoe on the rail. Changes in the amount of pressure and the relative position of the shoe with respect to the rail may also be made by raising or lowering the shaft 46 in the openings 23.

It can be seen from the foregoing that this invention provides a current collector that will maintain the collector shoe in contact with the power rail throughout its operation because of the pressure exerted on the collector shoe by the action of the elastomeric torsion member being stressed when the shoe is placed on the rail. It should be obvious from the foregoing that various modifications may be made within the scope of this invention without departing from the appended claims.

I claim:

1. An electric power collector adapted to supply power to a car from an electrified distribution rail, comprising support means, a collector shoe adapted for traveling engagement with said rail, means in conjunction with said support means for carrying said shoe in pivotal relationship thereto, said shoe carrying means cooperating with an elastomeric torsion member to maintain the collector shoe in traveling engagement with said rail, and means for limiting downward movement of said collector shoe when said collector shoe is not in contact with said distribution rail, said limiting means including a substantially vertically disposed support arm extending downwardly from said shoe carrying means, said support means including a stop member adapted to engage said vertically disposed support arm when said collector shoe is not in contact with said distribution rail.

2. An electric power collector adapted to supply power to a car from an electrified distribution rail, comprising support means including two spaced elongated members of structural insulating material extending generally parallel to each other and perpendicular from a rail car carrying the collector, a collector shoe adapted for traveling engagement with said rail, means in conjunction with said support means for carrying said shoe in pivotal relationship thereto, each of said spaced elongated members being provided with a vertically disposed opening adapted to receive said shoe carrying means and adapted to vary the position of said shoe carrying means with respect to said elongated members, said shoe carrying means cooperating with an elastomeric torsion member to maintain the collector shoe in traveling engagement with said rail.

3. An electric power collector according to claim 2 wherein said shoe carrying means includes a shaft extending between said two spaced elongated members and is secured to said members, said shaft being nonrotatably secured to said elastomeric torsion member and extending therethrough to support said elastomeric torsion member between said spaced elongated members.

4. An electric power collector adapted to supply power to a car from an electrified distribution rail comprising a collector shoe engaged with a surface of the distribution rail for running engagement therewith, two longitudinally spaced elongated members of structural insulating material extending generally perpendicularly from said car, means for carrying the collector shoe between said elongated members for pivotal movement with respect thereto comprising a shaft extending longitudinally between said elongated members, an annular part of said collector shoe disposed about said shaft, an elastomeric torsion member between said shaft and said annular part for maintaining the collector shoe substantially in running engagement with said rail, each of said elongated members being provided with a substantially vertical elongated opening adapted to receive said shaft, each of said elongated members being provided with a plurality of grooves, the axes of which are normal to the major axes of said openings, a washer at each end of said shaft having a surface in contact with its associated elongated member, said surface having a plurality of grooves adapted to engage the grooves on its associated elongated member whereby said shaft location may be adjusted.

* * * * *